United States Patent

Shona

[19]

[11] Patent Number: 6,104,625
[45] Date of Patent: Aug. 15, 2000

[54] VOLTAGE GENERATOR

[75] Inventor: Yoshihiro Shona, Tokyo, Japan

[73] Assignee: Oki Electric Industry Co., Ltd., Tokyo, Japan

[21] Appl. No.: 09/385,439

[22] Filed: Aug. 30, 1999

[30] Foreign Application Priority Data

Sep. 1, 1998 [JP] Japan .................................. 10-246614

[51] Int. Cl.$^7$ .................................................. H02M 5/42
[52] U.S. Cl. ............................................... 363/89; 363/61
[58] Field of Search .................................. 363/16, 34, 44, 363/47, 80, 81, 82, 89, 60, 61; 323/222, 265

[56] References Cited

U.S. PATENT DOCUMENTS 4,964,029  10/1990  Severinsky et al. ...................... 363/80
5,877,610   3/1999  Copple ..................................... 323/222
5,978,242  11/1999  Raad et al. ............................... 363/89

FOREIGN PATENT DOCUMENTS 4-23092    1/1992  Japan .
10-97601   4/1998  Japan .

*Primary Examiner*—Jessica Han
*Attorney, Agent, or Firm*—Jones Volentine, LLP

[57] ABSTRACT

A rectifier circuit 30 of a voltage genetator rectifies alternating current signals provided through electromagnetic induction of a coil. The rectified signals are boosted by rectifying the voltage of nodes of the coil by capacitors, and the voltage genetator generates a predetermined voltage by smoothing the boosted signals using a capacitor.

21 Claims, 2 Drawing Sheets

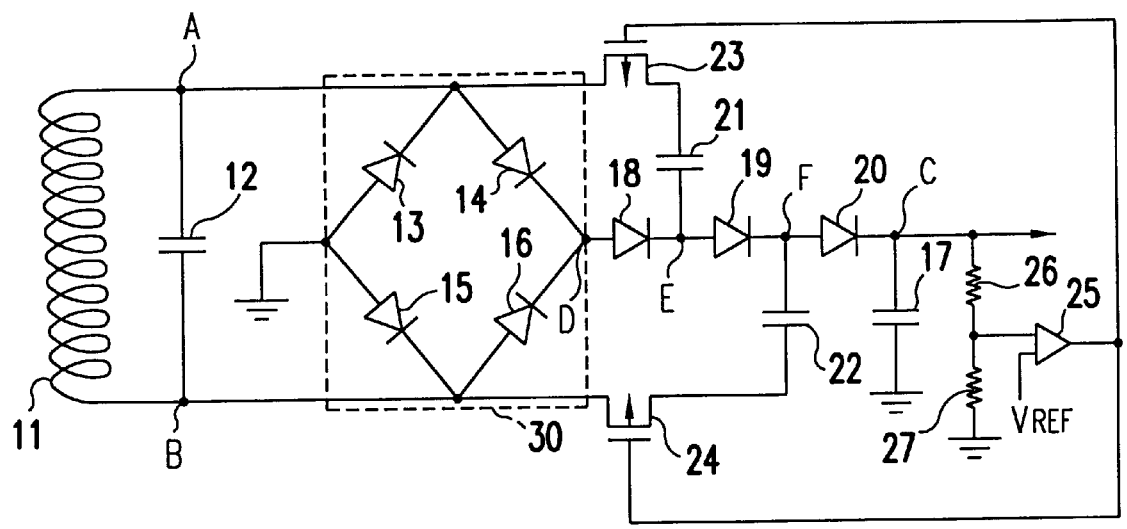
FIG.3
 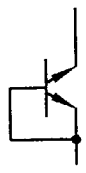 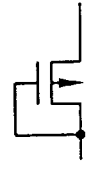
FIG.4A  FIG.4B  FIG.4C

VOLTAGE GENERATOR

BACKGROUND OF THE INVENTION

1. Field of the Invention

This invention relates to a voltage generator, and particularly to a voltage generator for generating a predetermined voltage through the use of electromagnetic induction, based on a received signal.

2. Description of the Related Art

A voltage generator has been applied to various devices. Of cards (hereinafter called "IC cards") each having a semiconductor integrated circuit incorporated therein, which have been widely used as portable storage media in particular, it is known that the voltage generator is used in a card (hereinafter called "non-contact IC card") capable of performing the transfer of data without having to use a contact terminal for an external signal.

The voltage generator built and used in the non-contact IC card generates a voltage through the use of electromagnetic induction, based on a signal transmitted from the outside of the non-contact IC card, for example. The voltage generated by the voltage generator is used as an operating voltage for other circuits (such as a semiconductor integrated circuit) incorporated into the non-contact IC card. This operating voltage is used as a source voltage or data to be processed by the semiconductor integrated circuit. This type of voltage generator has been disclosed in the following references:

(1) Japanese Patent Application Laid-Open No. Hei 4-23092

(2) Japanese Patent Application Laid-Open No. Hei 10-97601

As is understood from each disclosure referred to above, the voltage generator using electromagnetic induction is constructed so as to obtain a predetermined voltage, based on alternating current signals produced by a coil corresponding to a receiving circuit. Therefore, there may be a case in which when the distance between a coil of an external device (e.g., card reader/writer) and the coil of the voltage generator increases, a voltage or current based on ac signals produced by the coil of the voltage generator is not achieved to a level enough to produce an operating voltage. There has recently been an increasing demand for a voltage generator for generating a voltage having a sufficient level as an operating voltage, regardless of the distance between the external device and the voltage generator.

SUMMARY OF THE INVENTION

In order to meet the demand referred to above, an increase in the cost and an increase in the area for the voltage generator should desirably be avoided to the utmost.

Further, the voltage generator should desirably generate a voltage having a stable level as an operating voltage.

An object of the present invention is to provide a voltage generator for generating a voltage having a sufficient level as a required predetermined voltage.

Another object of the present invention is to implement the voltage generator for achieving the above object, by reducing an increase in the cost and an increase in the area for the voltage generator to the utmost.

A further object of the present invention is to implement the generation of a voltage having a stable level as a required predetermined voltage by the voltage generator for achieving the above object.

SUMMARY OF THE INVENTION

According to one aspect of this invention, for achieving the above objects, there is provided a voltage generator for generating a predetermined voltage by electromagnetic induction, based on a received signal, which comprises a receiving circuit for receiving alternating current signals through the use of electromagnetic induction, a rectifier circuit electrically connected to the receiving circuit and for rectifying the alternating current signals, a boosting circuit for boosting the signals rectified by the rectifier circuit, and a smoothing circuit for smoothing a signal boosted by the boosting circuit to thereby generate a predetermined voltage.

A typical embodiment of the present application has been described above. However, various embodiments of the present application and specific configurations of these embodiments will be understood from the following description.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is a circuit diagram showing a voltage generating circuit or voltage generator 200 according to a second embodiment of the present invention.

FIG. 4 is a variation showing a diode as one comprising element of the voltage generator.

DETAILED DESCRIPTION OF THE PREFERRED EMBODIMENTS

Figure 1:
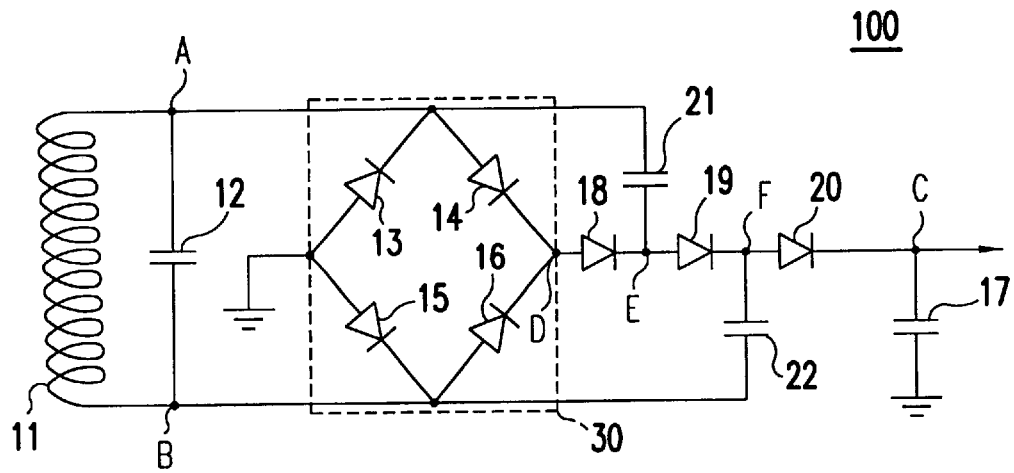
FIG. 1 is a circuit diagram showing a voltage generating circuit or voltage generator 100 according to a first embodiment of the present invention.

Voltage generators of the present invention will hereinafter be described with reference to the accompanying drawings. FIG. 1 is a circuit diagram showing a voltage generating circuit or voltage generator 100 according to a first embodiment of the present invention. Incidentally, the voltage generator 100 may be incorporated into a non-contact IC card in the first embodiment.

In FIG. 1, the voltage generator 100 comprises a coil 11 and a capacitor 12 which constitute a receiving circuit, diodes 13 through 16 used as bridge-connected four rectifying devices or elements, which constitute a rectifier circuit 30, forward-connected three diodes 18 through 20 and capacitors 21 and 22 used as capacitative elements, which constitute a booster or boosting circuit, and a capacitor 17 which constitutes a smoothing circuit.

The coil 11 is electrically connected between a node A and a node B. The capacitor 12 is also electrically connected between the node A and the node B. Therefore, a coil of an external device (e.g. card reader/writer) is placed so as to be opposed to the coil 11. When alternating current flows in the coil on the external device side as data to be transferred, electromagnetic induction occurs in the coil 11. Therefore, alternating current signals opposite in phase to each other are produced at the nodes A and B.

The capacitor 12 produces a resonance phenomenon incident to the ac signals produced at the nodes A and B to thereby increase the amplitudes of the ac signals produced at the nodes A and B. While the voltage generator 100 does not necessarily require the capacitor 12, the insertion of the capacitor 12 therein is effective because larger power is obtained.

The anode of the diode 13 is grounded and the cathode thereof is electrically connected to the node A. The anode of the diode 14 is electrically connected to the cathode of the diode 13 and the cathode thereof is electrically connected to a node D used as an output node of the rectifier circuit 30. The anode of the diode 15 is grounded and the cathode thereof is electrically connected to the node B. The anode of the diode 16 is electrically connected to the cathode of the diode 15 and the cathode thereof is electrically connected to the node D used as the output node of the rectifier circuit 30. Namely, the rectifier circuit 30 is a full-wave rectifying circuit in which the four diodes 13 through 16 are placed in a bridge-connected configuration.

The rectifier circuit 30 comprised of the four diodes 13 through 16 rectifies the ac signals produced at the nodes A and B respectively and outputs a signal obtained by superimposing voltage levels of the rectified signals on one another from the node D.

The anode of the diode 18 is electrically connected to the node D and the cathode thereof is electrically connected to a node E. The anode of the diode 19 is electrically connected to the node E and the cathode thereof is electrically connected to a node F. The anode of the diode 20 is electrically connected to the node F and the cathode thereof is electrically connected to a node C. The capacitor 21 has one end electrically connected to the node A and the other end electrically connected to the node E. The capacitor 22 has one end electrically connected to the node B and the other end electrically connected to the node F.

With the signal at the node D, which has reached the node E through the diode 18 as the reference, the boosting circuit comprised of the diodes 18 through 20 and the capacitors 21 and 22 superimposes, at the node E, the signal at the node D on the signal at the node A, which has reached the node E through the capacitor 21 thereby to boost the voltage at the node E. Similarly, with the signal, which has reached the node F through the diode 19 as the reference, the signal at the node B is superimposed on that signal at the node F, so that the voltage at the node F is boosted. The boosted signal at the node F is outputted through the diode 20 as a signal outputted from the boosting circuit.

The capacitor 17 has one end electrically connected to the node C and the other end electrically grounded. The smoothing circuit comprised of the capacitor 17 is used to smooth the amplitude of the signal produced on the cathode side of the diode 20, which corresponds to the output of the boosting circuit. The smoothed signal is produced at the node C. The smoothed signal developed at the node C is outputted as a signal outputted from the smoothing circuit. Namely, the dc voltage developed at the node C results in an output produced from the voltage generator 100. This output is used as a voltage for operating other circuits (e.g., a semiconductor integrated circuit) incorporated into the non-contact IC card, for example.

Figure 2:
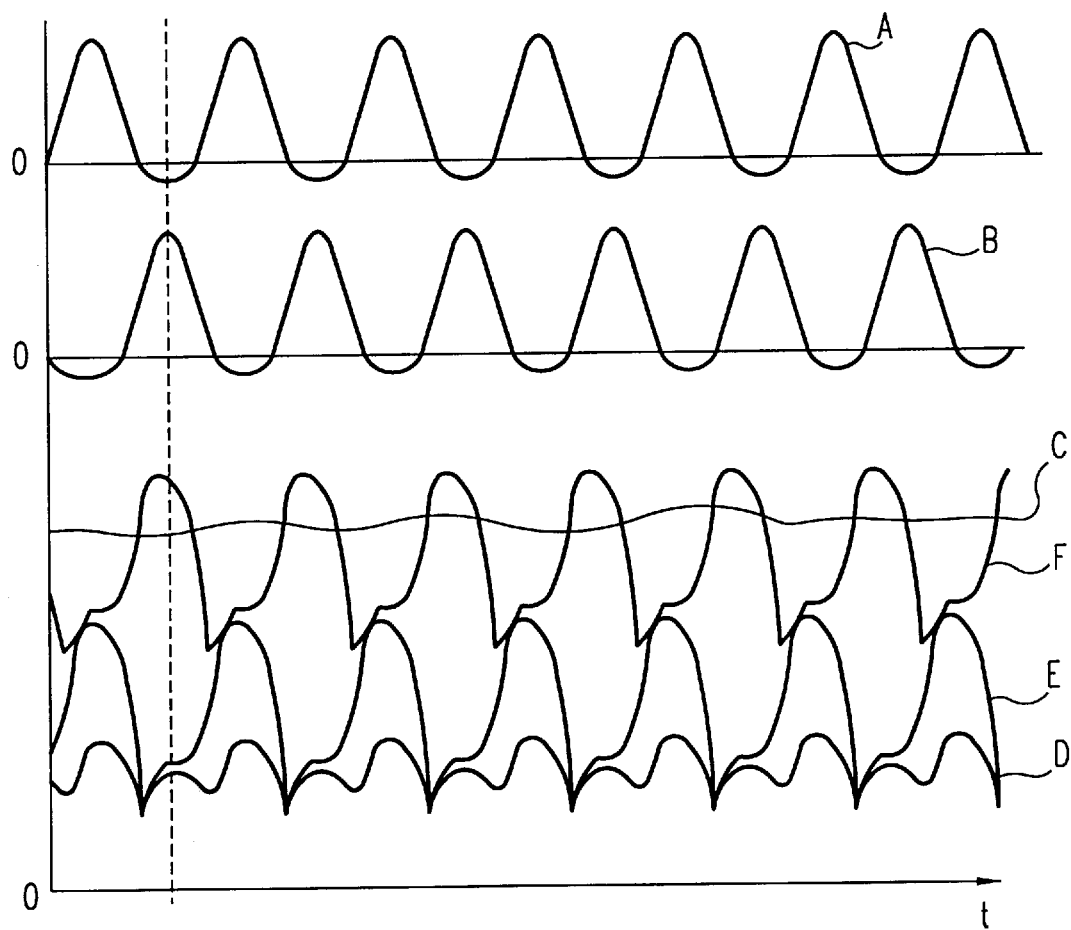
FIG. 2 is a diagram showing signal waveforms for explaining the operation of the voltage generator 100.

The operation of the voltage generator 100 constructed as described above will be explained in more detail with reference to the drawings. FIG. 2 is a diagram showing signal waveforms at the nodes A through F of the voltage generator 100. In FIG. 2, the vertical axis indicates the voltage and the horizontal axis indicates the time. Further, symbols A through F in FIG. 2 correspond to the nodes A through F designated at the same symbols respectively. "0" on the vertical axis in FIG. 2 indicates that the voltage is 0V. This is defined as a reference for comparison with the respective waveforms.

When the electromagnetic induction occurs in the coil 11 as described above, the ac signals occur in the nodes A and B respectively. It is understood that the signals at the nodes A and B are opposite in phase as designated at symbols A and B in FIG. 2. The waveforms designated at symbols A and B in FIG. 2 respectively indicate the states of the signals as viewed from the nodes A and B with a ground voltage on the anode sides of the diodes 13 and 15 constituting the rectifier circuit 30 as the reference.

The ac signals developed at the nodes A and B are respectively rectified by the rectifier circuit 30 and the so-rectified two signals appear at the node D in an superimposed state. As designated at symbol D in FIG. 2, the voltage level of the signal developed at the node D is low over its entirety.

The signal produced at the node D reaches the node E through the diode 18. Further, when the voltage of the node A rises, the voltage at the node A is applied to the node E through the capacitor 21 with the voltage at the node E as the reference. Therefore, the voltage at the node E substantially results in one obtained by increasing the voltage of the signal developed at the node D by the voltage at the node A.

On the other hand, when the voltage at the node A drops or decreases, the signal at the node A is superimposed on the signal at the node E through the capacitor 21, based on the voltage at the node E, so that the voltage at the node E is lowered. However, when the voltage at the node E is lowered and reduced from the voltage applied to the anode of the diode 18 by the threshold voltage of the diode 18, the diode 18 is brought to a conducting state. Therefore, since the voltage at the node D is applied to the node E, the voltage at the node E is not extremely reduced. Since the diode 18 is connected to the node D in the reverse direction as viewed from the node E, the voltage at the node E is not returned to the rectifier circuit 30 through the diode 18.

Similarly, the signal developed at the node E reaches the node F through the diode 19. When the voltage at the node B rises, the voltage at the node B is applied to the node F through the capacitor 22 with the voltage at the node F as the reference. Therefore, the voltage at the node F substantially results in one obtained by increasing the voltage of the signal developed at the node E by the voltage at the node B.

On the other hand, when the voltage at the node B steps down, the signal at the node B is superimposed on the signal at the node F through the capacitor 22, based on the voltage at the node F, so that the voltage at the node F is lowered. However, when the voltage at the node F is lowered and reduced from the voltage applied to the anode of the diode 19 by the threshold voltage of the diode 19, the diode 19 is brought into conduction. Therefore, since the voltage at the node E is applied to the node F, the voltage at the node F is not extremely reduced. Since the diode 19 is connected to the node E in the reverse direction as viewed from the node F, the voltage at the node F is not fed back to the rectifier circuit 30 through the diode 19.

As designated at symbols E and F in FIG. 2, the voltage of the signal developed at the node E is higher than the voltage of the signal at the node D, designated at symbol D in voltage level, and the voltage of the signal developed at the node F is higher than the voltage of the signal developed at the node E in voltage level.

Incidentally, as described above, the signal developed at the node D results in one obtained by superimposing the signals developed at the nodes A and B, i.e., the signals supplied through the diodes 14 and 16 on one another. Therefore, the waveform designated at symbol D shown in FIG. 2 results in a waveform reduced by the voltage applied to the node E since the voltage is applied to the node E when the voltage at the node A is lowered and the voltage at the node E is reduced. Since the node E is already replenished with a voltage with respect to a drop in the voltage of the node E while similar effects are performed even on the node F, an influence exerted on the node D is small.

The boosted signal developed at the node F reaches the node C through the diode 20. The signal, which has reached the node C, results in a signal smoothed by the capacitor 17 as indicated by symbol C in FIG. 2.

Thus, the voltage generator 100 according to the first embodiment is capable of boosting or increasing the voltage of the signal corresponding to the output of the voltage generator 100 owing to the provision of the boosting circuit. Therefore, even if the amplitudes of the ac signals generated by the coil 11 are rendered small with an increase in the distance between the coil 11 of the voltage generator 100 and the coil of the external device, the voltage level sufficient as the operating voltage for other circuits incorporated into the non-contact IC card together with the voltage generator 100 can be ensured as the output of the voltage generator 100.

Particularly when the output of the voltage generator 100 is used as a source voltage, the voltage used as the reference for permitting various functions of other-circuits incorporated therein together with the voltage generator 100 is ensured. It is therefore possible to assure the operations of other circuits built in the card together with the voltage generator 100 with certainty.

Since the amplitudes of the ac signals developed by the coil 11 may be small because the voltage generator 100 is provided with the boosting circuit, the coil may be reduced (in inductance). In this case, the voltage generator 100 can be reduced in cost.

Since the boosting circuit is made up of several capacitors and diodes and the operations of these components are controlled by the receiving circuit comprised of the coil 11 and the capacitor 12 and the rectifier circuit 30, the voltage generator 100 does not include a large number of components to be added to the boosting circuit and need not have complex configurations for controlling the operation of the boosting circuit. Therefore, an increase in the cost and an increase in the area for the voltage generator can be reduced to the utmost.

A voltage generator according to a second embodiment will next be explained below with reference to the drawings. FIG. 3 is a circuit diagram showing a voltage generator 200 according to the second embodiment. In FIG. 3, elements of structure similar to those employed in the voltage generator 100 shown in FIG. 1 are identified by the same reference numerals to avoid the description of common elements.

In FIG. 3, P channel MOS transistors 23 and 24, a comparator 25, and resistive elements 26 and 27 which constitute a supervisory or monitor circuit, are additionally provided as compared with FIG. 1. Other components in FIG. 3 are similar to those shown in FIG. 1.

One electrode of the transistor 23 is electrically connected to a node A and the other electrode thereof is electrically connected to one end of a capacitor 21. Namely, the node A and the capacitor 21 are electrically connectable to each other through the transistor 23, One electrode of the transistor 24 is electrically connected to a node B and the other electrode thereof is electrically connected to one end of a capacitor 22. Namely, the node B and the capacitor 22 are electrically connectable to each other through the transistor 24.

One end of the resistive element 26 is supplied with a signal outputted from a node C and the other end thereof is electrically connected to a plus-side input terminal of the comparator 25. One end of the resistive element 27 is electrically connected to the plus-side input terminal of the comparator 25 and the other end thereof is grounded. A reference voltage $V_{REF}$ defined as a comparison reference is inputted to a minus-side input terminal of the comparator 25. Further, an output terminal of the comparator 25 is electrically connected to gate electrodes of the transistors 23 and 24 respectively.

The monitor circuit constructed as described above compares fixed voltages obtained by fractionating the voltage of the signal outputted from the node C with the resistive elements 26 and 27 and the reference voltage $V_{REF}$. When each fractional voltage is found to be lower than the reference voltage $V_{REF}$, the monitor circuit allows a boosting circuit to perform its boosting operation. In this case, the comparator 25 outputs a signal whose voltage level is a ground voltage level (hereinafter called "L level") therefrom.

The transistors 23 and 24 are brought into conduction according to the voltage level of the output signal of the comparator 25. In this state, the voltage generator 200 shown in FIG. 3 is capable of performing operation similar to that of the voltage generator 100 shown in FIG. 1.

When the fractional voltage is greater than or equal to the reference voltage $V_{REF}$, the boosting of the boosting circuit is prohibited. In this case, the comparator 25 outputs a signal whose voltage level is a source voltage level (hereinafter called "H level") therefrom.

The transistors 23 and 24 are brought out of conduction according to the voltage level of the output signal of the comparator 25. In this condition, the voltage generator 200 shown in FIG. 3 serves so as to cut off electrical connections between the capacitor 21 constituting the boosting circuit and the node A and between the capacitor 22 constituting the boosting circuit and the node B. As a result, the voltages at the nodes to be boosted by the boosting circuit are not boosted.

Now, the reference voltage $V_{REF}$ is a voltage under which the comparator 25 is capable of determining whether the voltage level of the node C is a predetermined voltage required as the output of the voltage generator. In other words, when the voltages fractionated by the resistive elements 26 and 27 are lower than the reference voltage $V_{REF}$, the voltage at the node C becomes lower than the predetermined voltage necessary as the output of the voltage generator. Further, when the fractional voltages divided by the resistive elements 26 and 27 are greater than or equal to the reference voltage $V_{REF}$, the voltage at the node C becomes greater than or equal to the predetermined voltage required as the output of the voltage generator. The reference voltage $V_{REF}$ may be produced from a band-gap voltage or the like, for example.

Thus, the voltage generator 200 according to the second embodiment can obtain effects similar to those obtained by the voltage generator 100 according to the first embodiment. Further, since the voltage generator 200 is provided with the monitor circuit, the voltage at each node to be boosted by the boosting circuit is not boosted where the predetermined voltage required as the output of the voltage generator 200 is sufficiently obtained. Therefore, the other circuits to which the voltage corresponding to the output of the voltage generator 200 is applied, can be prevented from being destroyed due to a high voltage incident to excessive boosting. It is also possible to prevent needless power consumption due to the provision of a clamping circuit or the like for preventing such a destruction.

When the predetermined voltage required as the output of the voltage generator 200 is not sufficiently obtained due to the reason that, for example, a coil of an external device is distant from the coil of the voltage generator, the voltage generator 200 can increase the voltage at each node to be boosted by the boosting circuit.

While the voltage generator according to the present invention has been described above in detail, it is not necessarily limited to the construction referred to above.

The respective diodes that constitute the voltage generators 100 and 200 shown in FIGS. 1 and 3, may be a diode-coupled bipolar transistor shown in FIG. 4(b) or a diode-coupled MOS transistor shown in FIG. 4(c), for example. FIGS. 4(b) and 4(c) correspond to the direction of a diode shown in FIG. 4(a) and show its connected state. Similarly, the respective capacitors may be those utilizing gate portions of MOS transistors. Further, the resistive elements may use a MOS transistor normally brought into conduction if practicable.

Further, the capacitor 21 and diode 19 shown in FIG. 1 or 3 and the capacitor 22 and diode 20 shown in FIG. 1 or 3 are set in pairs respectively, and these respective pairs are alternately provided in plural form. In this condition, the voltages at the nodes A and B may be alternately boosted with efficiency. Although the number of components for the voltage generator increases in this case, a higher boosted voltage can be obtained.

As the non-contact IC card, there is known one which incorporates therein an electrically reprogrammable non-volatile memory such as an EEPROM or the like as a memory. A high voltage of about 20V is required to erase data from such a non-volatile memory and write data therein. The incorporation of the voltage generator according to the present invention into a device incorporating a memory requiring such a high voltage therein as well as the non-contact IC card makes it possible to use the boosted voltage generated by the voltage generator according to the present invention as a voltage for erasing data from the memory requiring the high voltage and writing data therein. In this case, it is unnecessary to provide a boosting circuit (e.g., a clock oscillator and a charge pump circuit) for the voltage used to erase the data from the memory requiring the high voltage and write the data therein, aside from the voltage generator. Thus, the device incorporating therein the memory requiring the high voltage can be brought into less size and cost. In particular, the voltage generator according to the present invention is effective for a strong demand for its less cost as in the non-contact IC card.

Further, the effects of the voltage generator according to the present invention can be obtained without providing the diode 18 or diodes 14 and 16 shown in FIG. 1 or 3. Namely, when the diode 18 is not provided, the node D is electrically directly connected to the other end of the capacitor 21. In this case, the diode 14 or 16 can prevent the feedback of the boosted voltage at the node D (or node E) to the node A or node B. On the other hand, when the diodes 14 and 16 are not provided, the cathode of the diode 13 is electrically connected to the node A, the cathode of the diode 15 is electrically connected to the node B, and the node B is electrically connected to the node D. In this case, the diode 18 can prevent the feedback of the boosted voltage at the node E to the node D. Since a voltage drop in each node to be boosted, corresponding to one diode is eliminated without impairment of the effects obtained in FIG. 1 or 3, the voltages at each individual nodes can be boosted at higher speed and effectively, Further, the transistors 23 and 24 may utilize an N channel MOS transistor respectively. It is in this case necessary to set the voltage level of the output of the comparator 25 in reverse as viewed from the above-described embodiment. In addition, bipolar transistors may be used as the MOS transistors.

Moreover, the voltage generator may be integrated into one chip together with other circuits (e.g., a circuit which uses a voltage outputted from the voltage generator as a source voltage or an operating voltage for data or the like). Since, in this case, the voltage generator according to the present invention restrains an increase in the number of the components as described above, the effects of uninterfering with a reduction in chip size of a semiconductor integrated circuit due to the voltage generator can be expected.

Thus, many changes can be made to the voltage generator according to the present invention if similar effects can be obtained based on operation similar to the present invention.

While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A voltage generator for generating a predetermined voltage by electromagnetic induction, based on a received signal, the voltage generator comprising:

a receiving circuit generating alternating current signals at first and second nodes by electromagnetic induction from an alternating current signal generated by an external apparatus;

a rectifier circuit electrically connected to the first and second nodes of said receiving circuit, said rectifier circuit rectifying the alternating current signals and outputting the rectified signals from an output node;

a boosting circuit electrically connected between the first and second nodes, said boosting circuit boosting the rectified signals output from the output node with a voltage on the first and second nodes; and a smoothing circuit smoothing a signal boosted by said boosting circuit to thereby generate the predetermined voltage.

2. The voltage generator of claim 1, disposed on a portable storage module, wherein the predetermined voltage is used as a power voltage of the portable storage module.

3. The voltage generator of claim 1, said receiving circuit comprising a coil connected between the first node and the second node.

4. The voltage generator of claim 1, said receiving circuit comprising a coil and a capacitor, each connected between the first node and the second node.

5. The voltage generator of claim 1, wherein said boosting circuit comprises:

at least one rectifier element, a first of the rectifier elements receiving the rectified signals from the output node;

a first capacitor element electrically connected between the first node and an input side of one of the rectifier elements; and a second capacitor element electrically connected between the second node and an output side of one of the rectifier elements.

6. The voltage generator of claim 5, said voltage generator further comprising:
a first switch connected between the first node and said first capacitor element;
a second switch connected between the second node and said second capacitor element; and
a monitor circuit monitoring the predetermined voltage and turning said first and second switches on and off based on a monitoring result.

7. The voltage generator of claim 6, disposed on a portable storage module, wherein the predetermined voltage is used as a power voltage of the portable storage module.

8. The voltage generator of claim 5, disposed on a portable storage module, wherein the predetermined voltage is used as a power voltage of the portable storage module.

9. The voltage generator of claim 1, further comprising a monitor circuit monitoring the predetermined voltage and controlling a boosting operation of aid boosting circuit in accordance with a monitoring result.

10. The voltage generator of claim 9 disposed on a portable storage module, wherein said monitor circuit controls said boosting circuit to boost the predetermined voltage when the predetermined voltage is lower than an activating voltage of the portable storage module.

11. The voltage generator of claim 10, wherein the predetermined voltage is used as a power voltage of the portable storage module.

12. The voltage generator of claim 9 disposed on a portable storage module, wherein the predetermined voltage is used as a power voltage of the portable storage module.

13. A method of generating a predetermined voltage by electromagnetic induction from a received signal comprising:
generating alternating current signals at first and second nodes by electromagnetic induction from an alternating current signal received from a remotely located apparatus;
rectifying the alternating current signals provided at the first and second nodes to generate rectified output signals;
boosting the rectified signals with voltages at the first and second nodes to provide a boosted signal; and
smoothing the boosted signal to provide the predetermined voltage.

14. The method of generating a predetermined voltage of claim 13, wherein said boosting comprises:
rectifying the rectified signals with rectifier elements;
coupling the voltage at the first node to an input of one of the rectifier elements via a first capacitor; and
coupling the voltage at the second node to an output of the one rectifier element via a second capacitor to provide the boosted signal.

15. The method of generating a predetermined voltage of claim 14, further comprising monitoring the predetermined voltage, said boosting further comprising selectively coupling the voltage at the first node to the input of the one rectifier element and selectively coupling the voltage at the second node to the output of the one rectifier element, based on a monitoring result.

16. The method of generating a predetermined voltage of claim 13, further comprising monitoring the predetermined voltage and controlling said boosting in accordance with a monitoring result.

17. The method of generating a predetermined voltage of claim 16, wherein the predetermined voltage is generated on a portable storage module and wherein said monitoring controls said boosting to boost the predetermined voltage when the predetermined voltage is lower than an activating voltage of the portable storage module.

18. The method of generating a predetermined voltage of claim 13, wherein the alternating current signals are generated by a coil provided across the first and second nodes.

19. A voltage generator comprising:
a coil sensing an alternating current signal applied from a remotely located apparatus, said coil having first and second nodes and providing alternating current signals at the first and second nodes upon sensing the applied alternating current signal;
a rectifying bridge coupled across the first and second nodes of said coil, said rectifying bridge rectifying the alternating current signals to provide rectified signals from an output node;
a booster coupled to the first and second nodes of said coil, said booster boosting the rectified signals from the output node with voltages at the first and second nodes to provide a boosted signal; and
a smoother smoothing the boosted signal to thereby generate a predetermined voltage signal.

20. The voltage generator of claim 19, wherein said booster comprises:
rectifiers coupled to the output node of said rectifying bridge;
a first capacitor coupled between the first node and an input of one of said rectifiers; and
a second capacitor coupled between the second node and an output of the one rectifier.

21. The voltage generator of claim 20, further comprising:
a first switch coupled between the first node and said first capacitor;
a second switch coupled between the second node and said second capacitor; and
a monitor monitoring the predetermined voltage and selectively switching said first and second switches on and off based on a monitoring result.

* * * * *